(12) United States Patent
Komatsu et al.

(10) Patent No.: US 8,232,741 B2
(45) Date of Patent: *Jul. 31, 2012

(54) ELECTRONIC BALLAST WITH CONTROLLED LAMP PREHEATING

(75) Inventors: Naoki Komatsu, Kobe (JP); Daisuke Yamahara, Shijonawate (JP)

(73) Assignee: Panasonic Corporation, Osaka (JP)

( * ) Notice: Subject to any disclaimer, the term of this patent is extended or adjusted under 35 U.S.C. 154(b) by 287 days.

This patent is subject to a terminal disclaimer.

(21) Appl. No.: 12/605,450

(22) Filed: Oct. 26, 2009

(65) Prior Publication Data

US 2010/0109542 A1 May 6, 2010

(30) Foreign Application Priority Data

Oct. 28, 2008 (JP) .................................. 2008-277424

(51) Int. Cl.
*H05B 37/02* (2006.01)

(52) U.S. Cl. ..................... 315/307; 315/209 R; 315/291

(58) Field of Classification Search .................. 315/119, 315/246, 224, 291, 209 R, 244, 227, 307, 315/308, DIG. 5
See application file for complete search history.

(56) References Cited

U.S. PATENT DOCUMENTS

| | | | | |
|---|---|---|---|---|
| 5,583,402 A | * | 12/1996 | Moisin et al. | 315/307 |
| 5,770,926 A | * | 6/1998 | Choi et al. | 315/307 |
| 6,140,771 A | * | 10/2000 | Luger et al. | 315/101 |
| 6,232,728 B1 | * | 5/2001 | Yamamoto et al. | 315/307 |
| 6,518,712 B2 | * | 2/2003 | Weng | 315/209 R |
| 6,965,204 B2 | * | 11/2005 | Langeslag | 315/209 R |
| 2006/0017405 A1 | * | 1/2006 | Breuer et al. | 315/307 |
| 2006/0214607 A1 | * | 9/2006 | Blake | 315/380 |

FOREIGN PATENT DOCUMENTS

WO  WO03039211  5/2003

* cited by examiner

*Primary Examiner* — Douglas W Owens
*Assistant Examiner* — Amy Yang
(74) *Attorney, Agent, or Firm* — Waddey & Patterson, P.C.; Mark J. Patterson; Gary L. Montle

(57) ABSTRACT

An electronic ballast provides controlled preheating for a discharge lamp. A power converting circuit receives a DC power input and converts it into an AC power output. A starting circuit coupled to the power converting circuit generates a high voltage for starting the lamp. A control circuit controls the power converting circuit to generate AC power output to the lamp dependent on a mode of operation. A symmetry detecting circuit determines a positive-negative symmetrical state of the output power provided to the discharge lamp with respect to ground. The control circuit has a starting mode wherein the discharge lamp is triggered to start with a high voltage generated by the starting circuit, an electrode heating mode wherein the AC power output of the power converting circuit is controlled to a first frequency for heating each lamp electrode, and a steady-state mode wherein the AC power output of the power converting circuit is controlled to a second frequency for maintaining lighting of the discharge lamp. The control circuit shifts from the electrode heating mode to the steady-state mode when the symmetry detecting circuit determines that the AC power output is in a positive-negative symmetrical state in the electrode heating operation.

24 Claims, 12 Drawing Sheets

ELECTRONIC BALLAST WITH CONTROLLED LAMP PREHEATING

CROSS-REFERENCES TO RELATED APPLICATIONS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. JP2008-277424, filed Oct. 28, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to an electronic ballast for powering a discharge lamp. More particularly, the present invention relates to an electronic ballast having associated circuitry for controlled preheating of a discharge lamp.

An electronic ballast as known in the art for lighting a hot-cathode type discharge lamp, such as a high-pressure discharge lamp also referred to as an HID (High-intensity discharge lamp), typically includes a power converting circuit for receiving DC power and outputting AC power and a control circuit for controlling the power converting circuit.

In an example of an electronic ballast as previously known in the art, the control circuit performs an electrode heating operation by increasing the output frequency of the power converting circuit to heat each electrode of the discharge lamp. This heating operation takes place after a lamp starting operation and before lamp steady-state operation. The electronic ballast of this example can stabilize discharge after a shift to the steady-state operation and suppress lamp fade-out as compared to the case where the electrode heating is not performed.

Referring to FIG. 18(a), a starting period P1 is shown during which a starting operation is performed. When a subsequent electrode heating period P2 is relatively short as shown, an electrode of the discharge lamp is not sufficiently heated before the start of a steady-state period P3 during which a steady-state operation is performed. This results in a lamp current becoming asymmetrical between polarities. When the electrode heating operation shifts to the steady-state operation where the electrode of the discharge lamp is not sufficiently heated, as described above, discharge becomes unstable, thereby possibly causing fade-out. Accordingly, it is necessary to set the electrode heating period P2 to be sufficiently long as shown in FIG. 18(b). The necessary length of the electrode heating period P2 (duration of the electrode heating operation) varies for each discharge lamp.

However, where multiple discharge lamps may be connected to the ballast, a particular duration of the electrode heating operation that accommodates all discharge lamps is likely to be excessive for some of the lamps. Because the electrode heating operation allows the power converting circuit to output larger power than in the steady-state operation, to suppress a negative effect on the life of the discharge lamp the duration of the electrode heating operation needs to be reduced as much as possible while properly heating the electrode.

BRIEF SUMMARY OF THE INVENTION

The present invention was made in consideration of the above matters, and an object thereof is to provide an electronic ballast which can set the duration of the electrode heating operation to a suitable length for each associated discharge lamp.

According to an aspect of the present invention, an electronic ballast includes a symmetry detecting circuit for determining whether or not power provided to the discharge lamp is in a positive-negative symmetrical state with respect to ground. When the symmetry detecting circuit determines that the output power is in the positive-negative symmetrical state in the electrode heating operation, a control circuit shifts the electrode heating operation to steady-state operation. As opposed to the case where the duration of the electrode heating operation is constant under all conditions, the duration of the electrode heating operation can be set to a suitable length for each discharge lamp.

According to other aspects of the present invention, the output of the symmetry detecting circuit is not reflected in the operation of the control circuit until a mask time has passed. Therefore, even if the lamp current is temporarily in the symmetrical state during a time period where discharge in the discharge lamp is unstable immediately after the start of the electrode heating operation, the control circuit does not prematurely shift the electrode heating operation to the steady-state operation.

According to another aspect of the present invention, the control circuit may stop outputting AC power from a power converting circuit when a duration of the electrode heating operation reaches an upper time limit without a determination by the symmetry detecting circuit that the output power is in the positive-negative symmetrical state. Excessive electrical stress on the discharge lamp and circuit components due to unlimited continuation of the electrode heating operation can thereby be prevented.

According to another aspect of the present invention, the control circuit may return the electrode heating operation to the starting operation when the duration of the electrode heating operation reaches the upper time limit without a determination by the symmetry detecting circuit that the output power is in the positive-negative symmetrical state. In this manner, the ability of the ballast to restart may be improved.

According to yet another aspect of the present invention, the control circuit may stop outputting AC power from the power converting circuit for a predetermined stop time, and then return the operation to the starting operation when the duration of the electrode heating operation reaches the upper time limit without a determination by the symmetry detecting circuit that the output power is in the positive-negative symmetrical state. In this manner, the ability of the ballast to restart may be improved, and a time required to start the discharge lamp after return to the starting operation is reduced.

According to yet another aspect of the present invention, the control circuit counts the number of times of returning from the electrode heating operation to the starting operation. When the number of times reaches a predetermined upper limit number of times, the control circuit stops outputting AC power from the power converting circuit. Exertion of excessive electrical stress on the discharge lamp and circuit components due to unlimited repetition of the starting operation and the electrode heating operation.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Hereinafter, an embodiment of the present invention will be described with reference to the above-mentioned figures.

Figure 1:
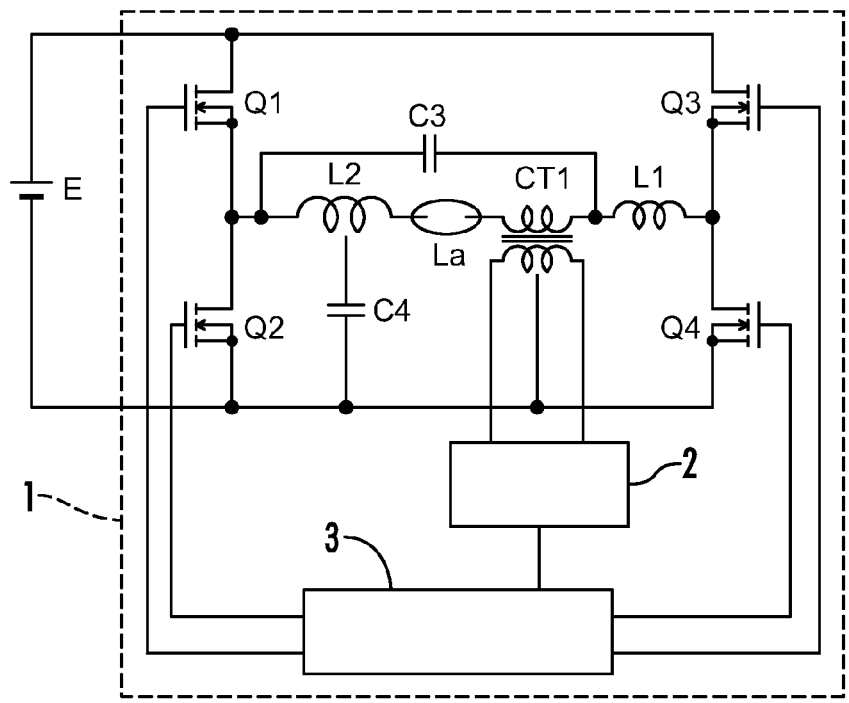
FIG. 1 is a circuit block diagram showing an embodiment of the electronic ballast of the present invention.

Referring to FIG. 1, an electronic ballast 1 of an embodiment of the present invention is provided to power a hot-cathode discharge lamp La such as a high-pressure discharge lamp, also referred to as an HID (High-Intensity Discharge lamp). The ballast 1 includes a full bridge inverter circuit including four switching elements Q1-Q4 as a power converting circuit for converting DC power input from a DC power source E into AC power. In the present embodiment, a field effect transistor (FET) may be used as the switching elements Q1-Q4. One output terminal of the full bridge circuit, that is, a connection point between the switching elements Q3, Q4 forming one of two series circuits which include two of the switching elements Q1-Q4 and are connected between output terminals of the DC power source E in parallel with each other, is connected to one end (that is, one electrode) of the discharge lamp La through a series circuit including a first inductor L1 and a primary winding of a current transformer CT1. The other output terminal of the full bridge circuit, that is, a connection point between the switching elements Q1, Q2 forming the other series circuit, is connected to the other end (that is, the other electrode) of the discharge lamp La through a second inductor L2. A first capacitor C3 is connected between the connection point of the switching elements Q1, Q2 and a connection point of the primary winding of the current transformer CT1 and the first inductor L1. The second inductor L2 can be an auto-transformer provided with a tap connected to ground through a capacitor C4. In other words, the first inductor L1, the first capacitor C3, the second inductor L2 and the second capacitor C4 along with the discharge lamp La constitute a resonant circuit connected between output terminals of the power converting circuit (the resonant circuit hereinafter referred to as a "load circuit").

The ballast 1 of the present embodiment further includes a symmetry detecting circuit 2 connected to a secondary winding of the current transformer CT1 for determining whether or not a current I1a outputted to the discharge lamp La (hereinafter referred to as "lamp current") is in a positive-negative symmetrical state. The ballast 1 further includes a control circuit 3 for driving each of the switching elements Q1 to Q4.

Figure 2:
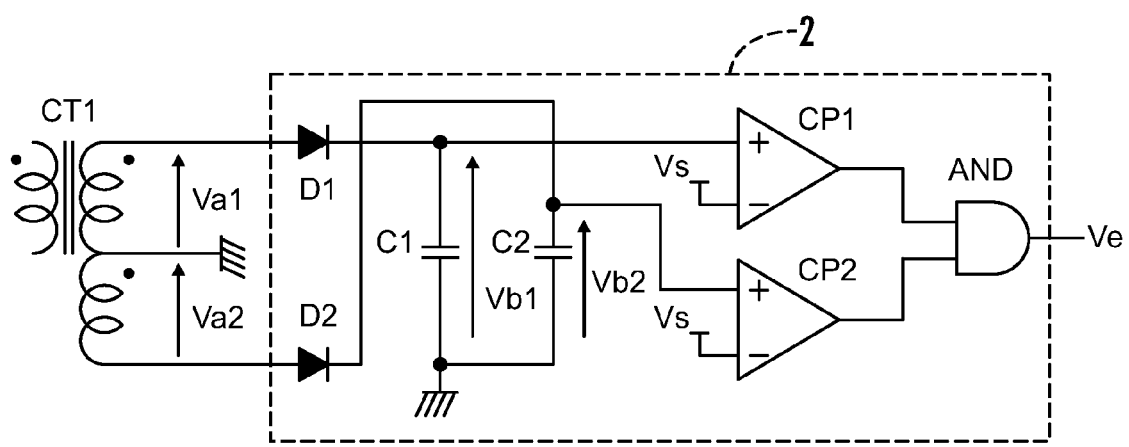
FIG. 2 is a circuit diagram showing a symmetry detecting circuit for use in the embodiment of FIG. 1.

The symmetry detecting circuit 2, as shown in FIG. 2, includes two comparators CP1, CP2 each having a non-inverting input terminal connected to one end of the secondary winding of the current transformer CT1 through diodes D1, D2 and an inverting input terminal receiving a predetermined symmetry detecting voltage Vs. An AND circuit provides an AND output of the two comparators CP1, CP2 to the control circuit 3.

Figure 3A:
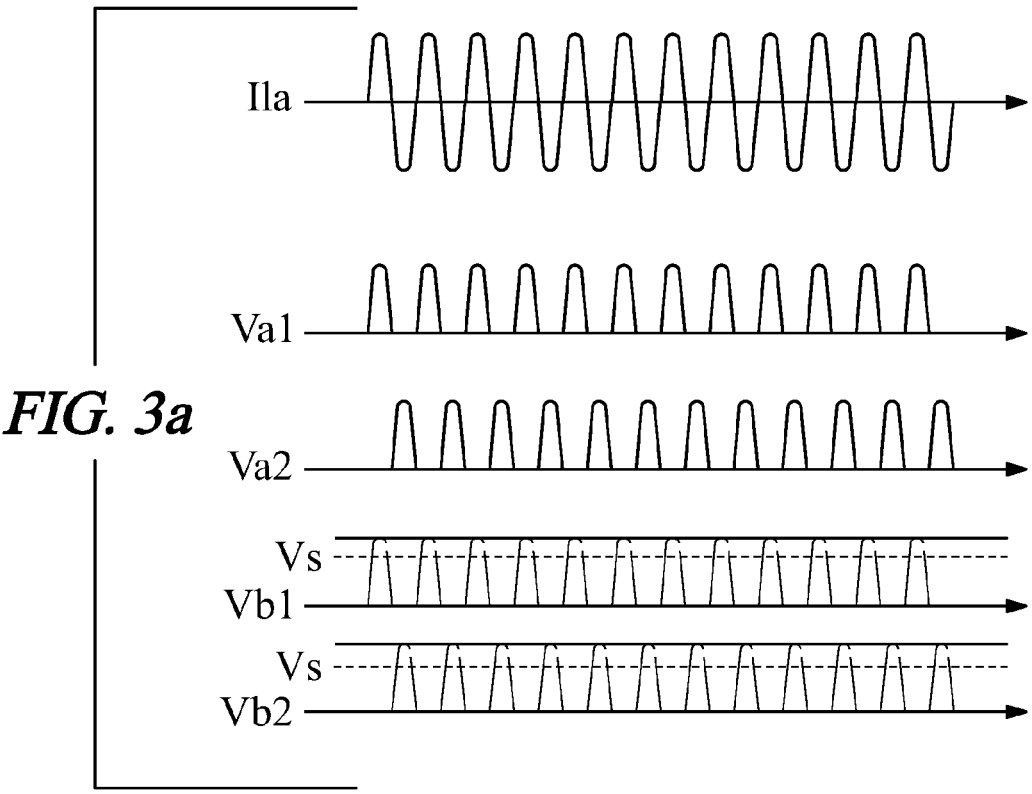
FIG. 3(a) is an illustrative diagram showing an example of operation of the symmetry detecting circuit in the embodiment of FIG. 1 where a lamp current is in a symmetrical state.
Figure 3B:
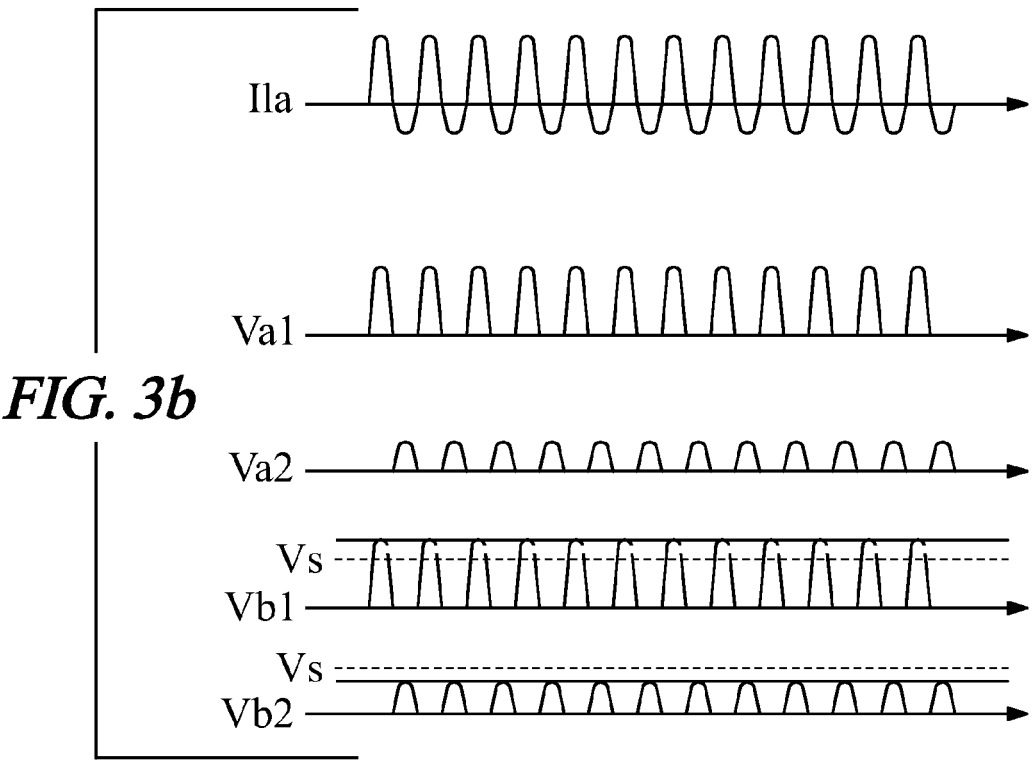
FIG. 3(b) is an illustrative diagram showing an example of operation of the symmetry detecting circuit in the embodiment of FIG. 1 where a lamp current is in an asymmetrical state.

A tap is provided in the center of the secondary winding of the current transformer CT1 and is connected to ground. Connection points between the non-inverting input terminals of each of the comparators CP1, CP2 and the diodes D1, D2 are connected to ground through capacitors C1, C2, respectively. In other words, charging voltages Vb1, Vb2 of each of the capacitors C1, C2 are voltages corresponding to a peak value of output voltages Va1, Va2 of the diodes D1, D2, respectively, that is, a peak value of the lamp current I1$a$ having a direction (polarity) corresponding to each of the capacitors C1, C2 and the charging voltages Vb1, Vb2 are input to the non-inverting input terminals of each of the comparators CP1, CP2 corresponding to the capacitors C1, C2 respectively. As shown in FIG. 3($a$), in the case where the lamp current I1$a$ is in a symmetrical state, both the charging voltages Vb1, Vb2 of the capacitors C1, C2 exceed the symmetry determining voltage Vs and thus, an output of the AND circuit (that is, an output of the symmetry detecting circuit 2, hereinafter referred to as "symmetry detecting output") Ve becomes a High level. On the other hand, in the case where the lamp current is in an asymmetrical state as shown in FIG. 3($b$), the charging voltage Vb2 of the capacitor C, falls below the symmetry determining voltage Vs and thus, the symmetry detecting output Ve becomes a Low level. In other words, the fact that the symmetry detecting output Ve is at the High level means that the symmetry detecting circuit 2 determines that the power output to the discharge lamp La is in a symmetrical state, while the fact that the symmetry detecting output Ve is at the Low level means that the symmetry detecting circuit 2 determines that the power output to the discharge lamp La is in an asymmetrical state.

Figure 4:
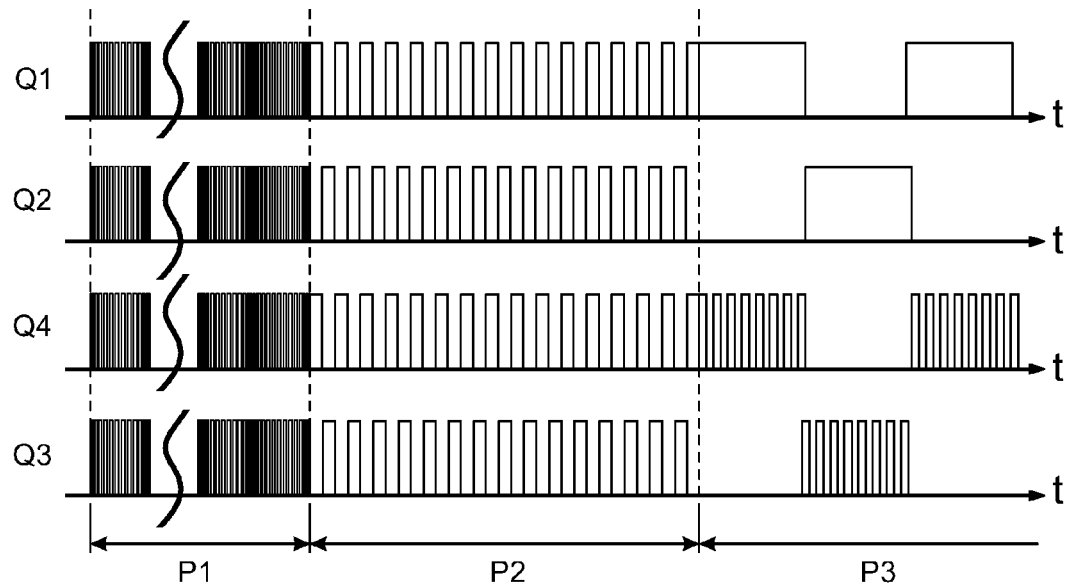
FIG. 4 is an illustrative diagram showing an example of a driving signal input from a control circuit to each switching element in the embodiment of FIG. 1.

As shown in FIG. 4, the control circuit 3 drives the switching elements Q1-Q4 so that the diagonally positioned switching elements Q1, Q4 and Q2, Q3 are simultaneously turned on while the serially-connected switching elements Q1, Q2 and Q3, Q4 are alternately turned on and off. Accordingly, DC power provided from the DC power source E is converted into AC power and a frequency of the AC power becomes a frequency of polarity inversion caused by driving on and off of the switching elements (hereinafter referred to as "operating frequency").

Figure 5:
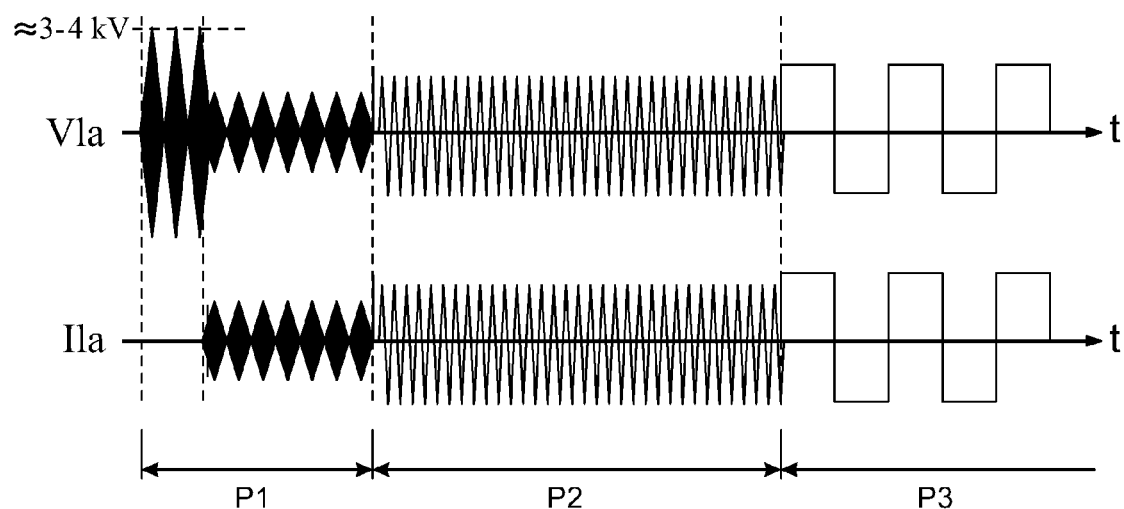
FIG. 5 is an illustrative diagram showing additional examples of operation in the embodiment of FIG. 1.

Operation of the control circuit 3 of various embodiments such as shown in FIG. 1 will be described in more detail below with further reference to FIGS. 4-6. FIG. 4 shows a driving signal input to each of the switching elements Q1-Q4, more specifically, a voltage applied between a gate and a source for each of the switching elements Q1 to Q4. Each of the switching elements Q1-Q4 are turned on in a period during which the driving signal is at the High level and turned off in a period during which the driving signal is at the Low level, respectively.

Figure 6:
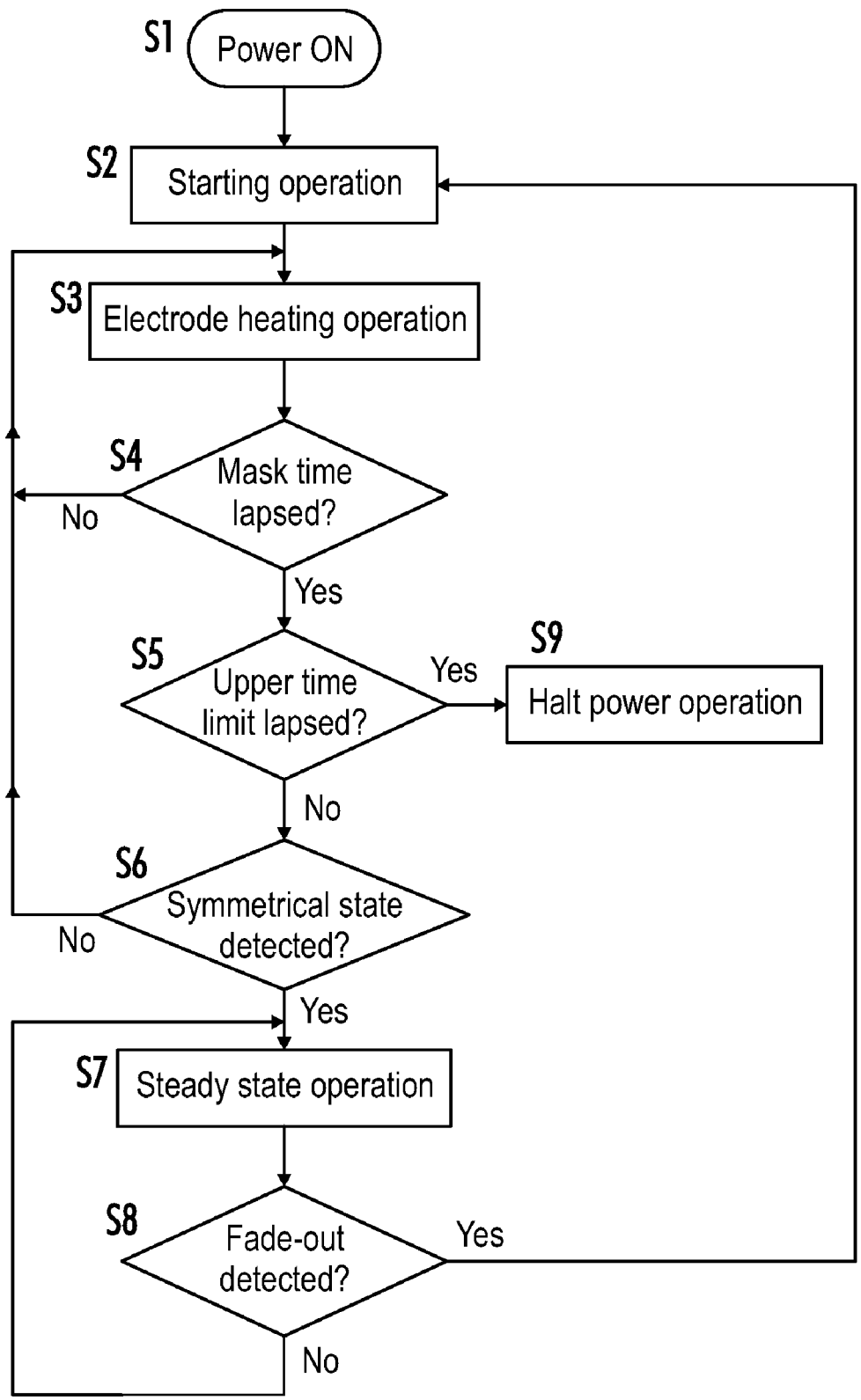
FIG. 6 is a flow chart showing an example of a method of operation in the embodiment of FIG. 1.

Referring now to FIG. 6, when power is on (S1), the control circuit 3 begins a starting operation for starting discharge lamp La (S2). In a starting period P1 during which the starting operation is performed, the control circuit 3 periodically varies the operating frequency in a range of a few dozens of kHz using the operating frequency of a few hundreds kHz. In the starting period P1, the operating frequency becomes a resonant frequency (or very near resonant frequency) of a resonant circuit including a primary winding portion of the second inductor L2 as an auto transformer, that is, a site between the connection point of the switching elements Q1, Q2 and the tap and the second capacitor C4. A resonance voltage generated at this time is increased by the second inductor L2 as the auto transformer, resulting in that a voltage output to the discharge lamp La (hereinafter referred to as "lamp voltage") V1$a$ reaches a voltage necessary for starting, that is, discharge (for example, 3 to 4 kV) and the discharge lamp La is started. The second inductor L2 and the second capacitor C4 may be thus described as constituting a starting circuit. In an example shown in FIG. 5, in a third cycle of the periodical variation in the operating frequency, the discharge lamp La is started, the lamp current I1$a$ begins to flow, and an amplitude of the lamp voltage V1$a$ is lowered due to variation in impedance which is caused by starting of the discharge lamp La.

After the above-mentioned starting operation has continued for a predetermined time period, the control circuit 3 finishes the starting operation. The starting period P1 proceeds to an electrode heating period P2 during which an electrode heating operation reduces the operating frequency smaller (for example, a few dozens of kHz) compared to the operating frequency in the starting operation (S3). The operating frequency in the electrode heating operation is a relatively high frequency, which is closer to a resonant frequency of the load circuit than the operating frequency in a steady-state operation as described later to heat each electrode of the discharge lamp La.

After initiating the electrode heating operation, the control circuit 3 does not reflect an output of the symmetry detecting circuit 2 on its operation until after a predetermined mask time has passed (S4). In the electrode heating operation, after the mask time has passed, the control circuit 3 begins monitoring the output of the symmetry detecting circuit 2 (S6). When the symmetry detecting circuit 2 determines that the lamp current I1$a$ is in a symmetrical state (that is, the symmetry detecting output Ve becomes H level, shown as YES at S6), the control circuit 3 finishes the electrode heating operation and shifts the electrode heating operation to the steady-state operation (S7). The mask time is generally set so that discharge in the discharge lamp La may become stabilized to a certain extent.

In the present embodiment, because the output of the symmetry detecting circuit 2 is not reflected on the operation of the control circuit 3 until the mask time has passed as described above, even if the lamp current I1$a$ temporarily enters the symmetrical state while discharge in the discharge lamp La is still unstable immediately after starting of the electrode heating operation, the control circuit 3 does not prematurely shift the electrode heating operation to the steady-state operation. Monitoring of the output of the symmetry detecting circuit 2 by the control circuit 3 may be performed at all times, that is, continuously, or may be performed periodically, that is, intermittently.

In a steady-state period P3 during which the steady-state operation is performed, the control circuit 3 lowers the operating frequency in the steady-state operation compared to the operating frequency in the electrode heating operation (for example, a few hundreds of kHz), thereby feeding rectangular wave AC power for maintaining lighting of the discharge lamp La to the discharge lamp La. In the steady-state operation, the control circuit 3 also performs a PWM control adjustment of power fed to the discharge lamp La by turning on/off the switching elements Q3, Q4 of one series circuit at a predetermined duty ratio without turning on at all times in the period during which the diagonally-located switching elements Q1, Q2 are turned on. Switching element Q3 is not turned on while switching elements Q1 or Q4 are turned on, and switching element Q4 is not turned on while switching elements Q2 or Q3 are turned on. Furthermore, in the steady-state operation, the control circuit 3 detects fade-out of the discharge lamp La based on, for example, the lamp current I1a (S8) and finishes the steady-state operation when fade-out is detected and returns to the starting operation at Step S2.

The control circuit 3 also counts the duration of the electrode heating operation. In the case where the duration of the electrode heating operation reaches a predetermined upper time limit without the symmetry detecting circuit 2 determining that the lamp current is in a symmetrical state (that is, the symmetry detecting voltage Ve is still at the Low level) (YES at S5), the control circuit 3 stops feeding power to the discharge lamp La, for example, by turning off each of the switching elements Q1-Q4 (S9).

With the above-mentioned configuration, by limiting the amount of time for performing the electrode heating operation to the time when the symmetry detecting circuit 2 determines that the lamp current I1a is in the symmetrical state, the electrode heating operation can be set to have a proper duration so that fade-out after a shift to the steady-state operation is less likely to occur and the duration is not excessive.

Furthermore, because the electrode heating operation does not continue beyond the upper time limit, electrical stress exerted on the discharge lamp La and circuit components can be reduced as compared to the case where the electrode heating operation continues without limitation.

Figure 7:
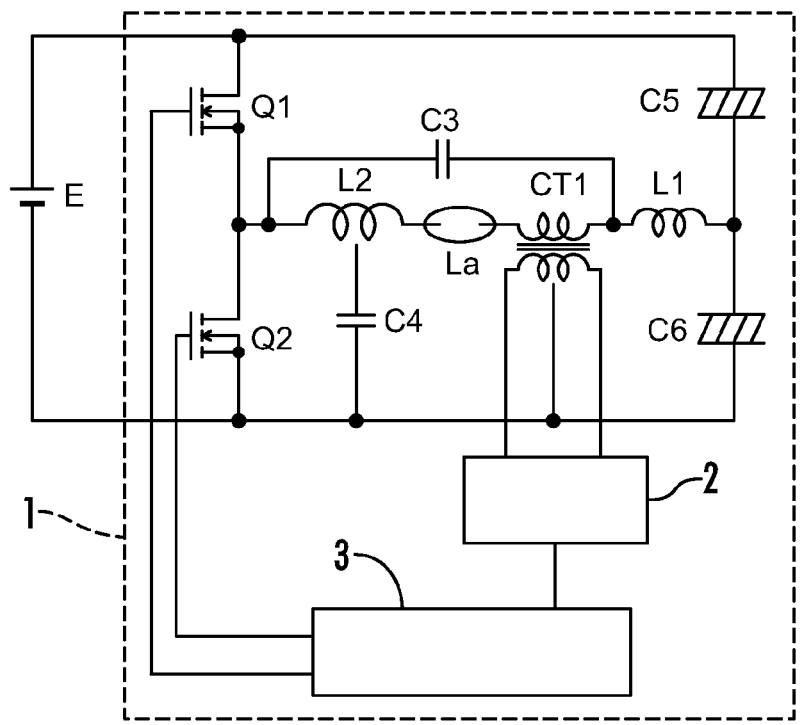
FIG. 7 is a circuit block diagram showing another embodiment of the present invention.
Figure 8:
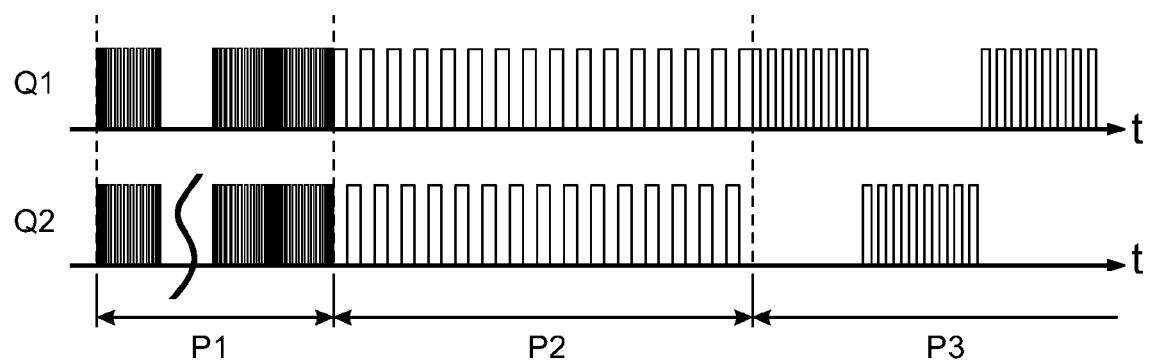
FIG. 8 is an illustrative diagram showing an example of the driving signal input from a control circuit to each switching element in the embodiment of FIG. 7.

In alternative embodiments of the circuit configuration described above and as shown in FIG. 7, a half bridge circuit is obtained by replacing each of the switching elements Q3, Q4 forming one series circuit with capacitors C5, C6, respectively, and may be adopted in place of the full bridge circuit as shown in FIG. 1. In this case, as shown in FIG. 8, driving the two switching elements Q1, Q2 serially-connected with each other is performed in the starting period P1 and the electrode heating period P2 as in the example shown in FIG. 1. However, in the steady-state period P3, a PWM control adjusts the power output to the discharge lamp La at the duty ratio of the switching elements Q1, Q2 to be turned on in the polarity non-inverting period.

Figure 9:
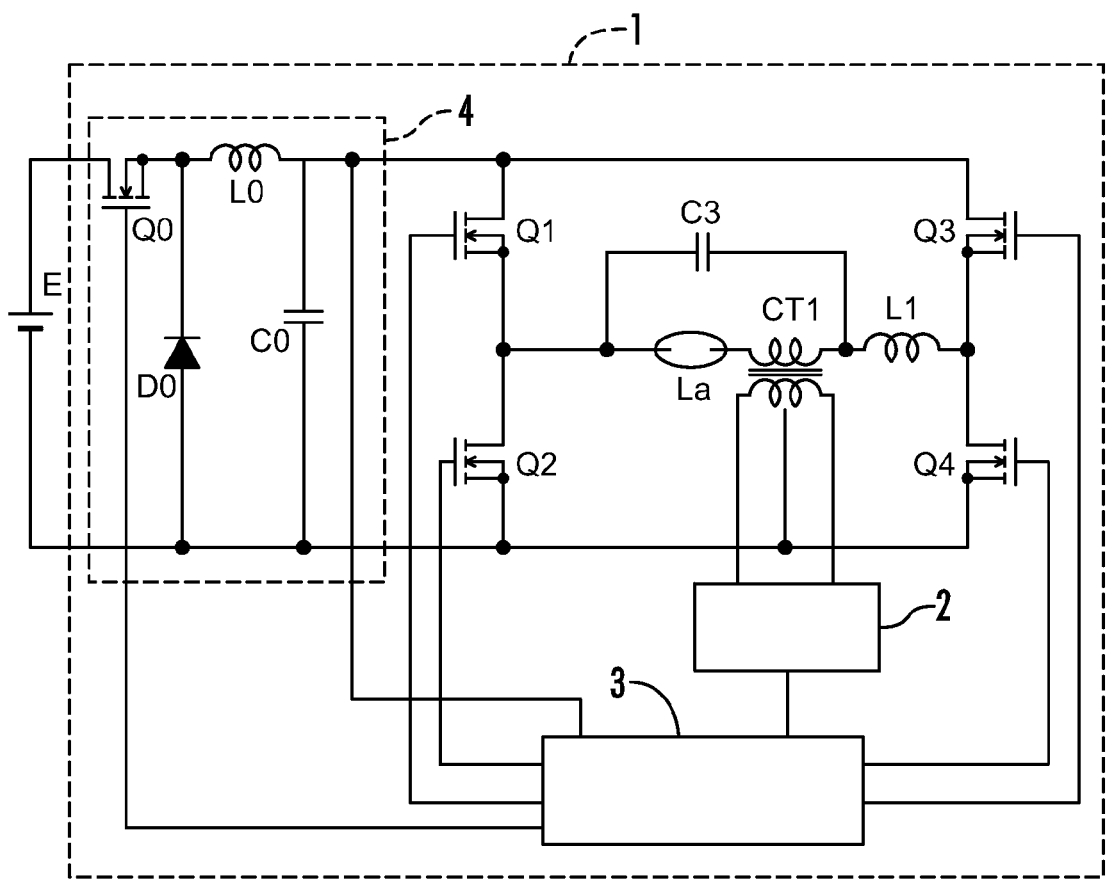
FIG. 9 is a circuit block diagram showing another embodiment of the present invention.

Referring now to FIG. 9, in an embodiment the ballast 1 may include a step-down chopper circuit 4 for lowering the output voltage of the DC power source E and outputting the voltage to the full bridge circuit. In this case, the power converting circuit includes the full bridge circuit, including the four switching elements Q1-Q4, and the step-down chopper circuit 4. In an example as shown in FIG. 9, the step-down chopper circuit 4 includes a switching element Q0 having one end connected to a high voltage-side output terminal of the DC power source E and the other end connected to the input terminal of the full bridge circuit through an inductor L0, a diode D0 having a cathode connected to a connection point of the switching element Q0 and the inductor L0 and an anode connected to ground, and a capacitor C0 connected between the input terminals of the full bridge circuit, that is, the output terminals of the step-down chopper circuit 4.

Figure 10:
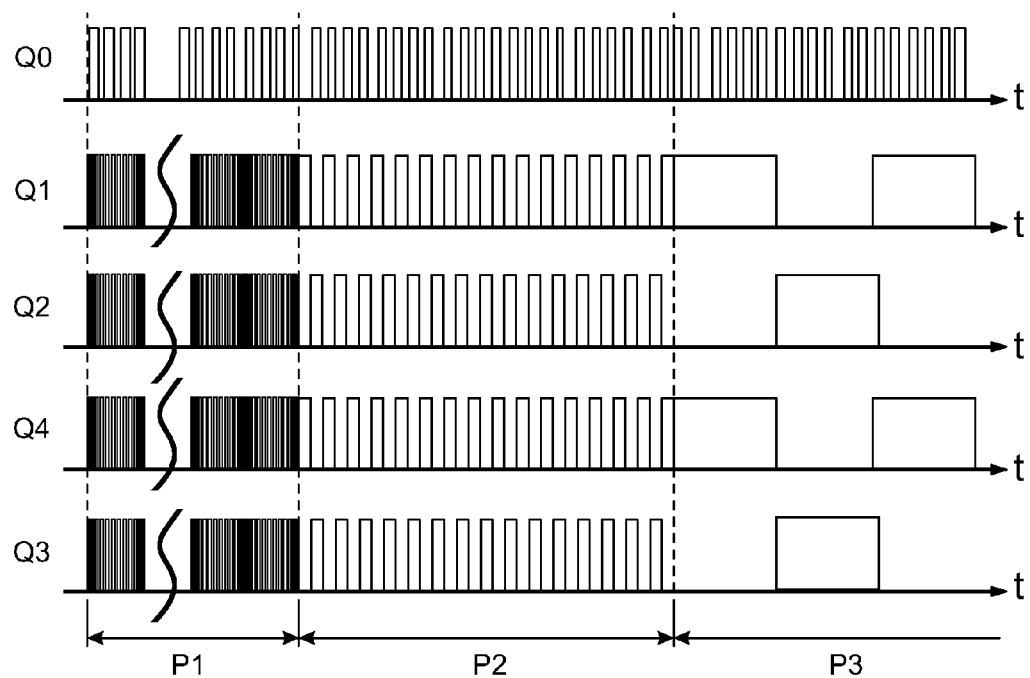
FIG. 10 is an illustrative diagram showing an example of the driving signal input from a control circuit to each switching element in the embodiment of FIG. 9.

In the embodiment shown in FIG. 9, the second inductor L2 and the second capacitor C4 are omitted from the load circuit and, in the starting operation, a high starting voltage is output to the discharge lamp La due to resonance of the resonant circuit including the first capacitor C3 and the first inductor L1. In other words, the first capacitor C3 and the first inductor L1 form the starting circuit. Furthermore, as shown in FIG. 10, because the control circuit 3 controls power fed to the discharge lamp La at the duty ratio of the switching element Q0 of the step-down chopper circuit 4, the PWM control by turning on/off the switching elements Q1-Q4 of the full bridge circuit is not performed even in the steady-state period P3.

Figure 11:
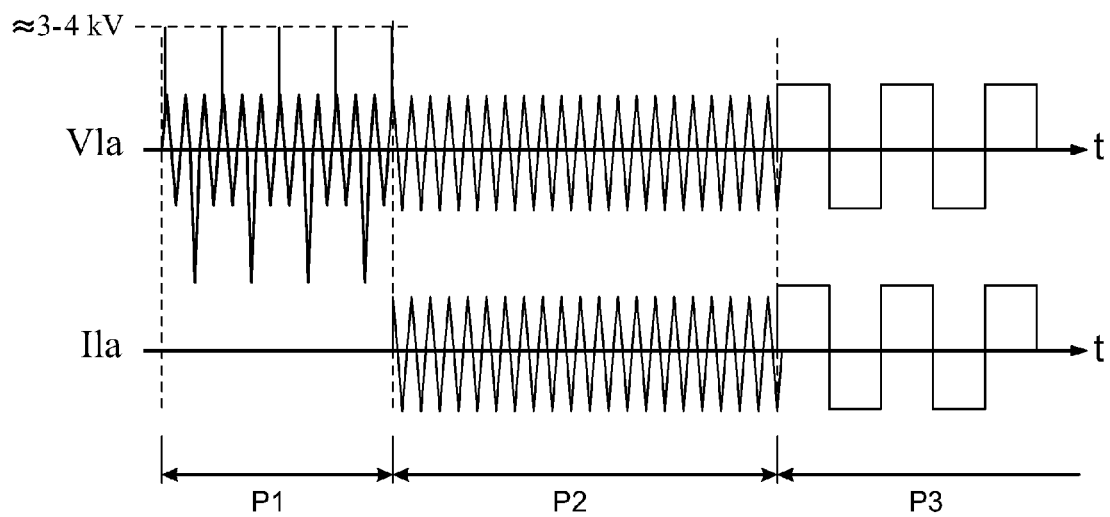
FIG. 11 is an illustrative diagram showing additional examples of operation in the embodiment of FIG. 9.

Alternatively, as shown in FIG. 11, a pulse generating circuit (not shown) may be provided as a starting circuit for generating a high voltage pulse to start the discharge lamp La in the starting operation. In this case, the operating frequency in the starting operation can be the same as the operating frequency in the electrode heating operation. Since the above-mentioned pulse generating circuit can be achieved in accordance with various previously described configurations of the present invention, further illustration and detailed description thereof are omitted.

Figure 12:
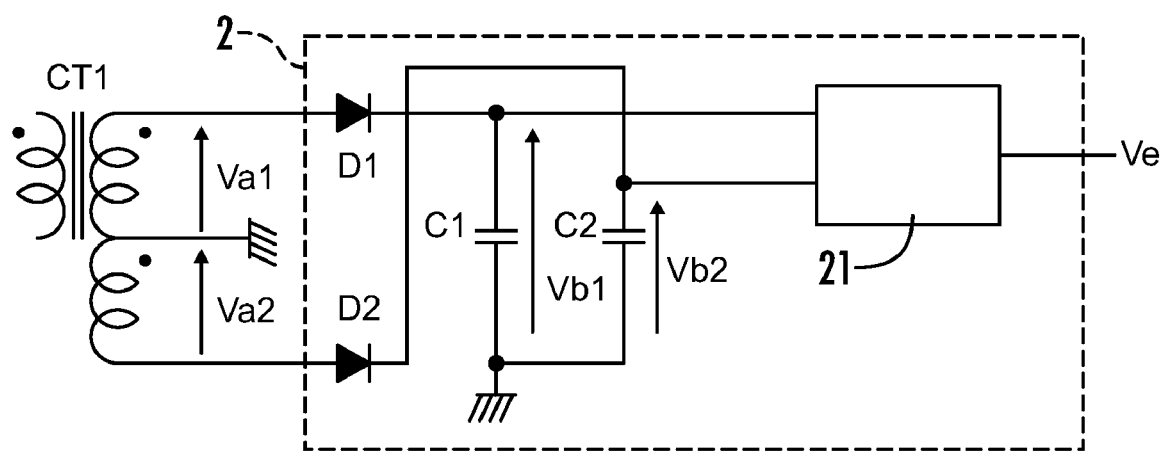
FIG. 12 is a circuit diagram showing an example of a symmetry detecting circuit in the embodiment of FIG. 9.

The symmetry detecting circuit 2 is not limited to the embodiment as shown in FIG. 2 and may be as alternatively shown in FIG. 12, for example. The symmetry detecting circuit 2 in FIG. 12 includes a calculating module 21 for calculating an absolute value |Vb1−Vb2| of a difference between input charging voltages Vb1, Vb2 of the capacitors C1, C2 and further for comparing the absolute value with a predetermined symmetry threshold, in place of the comparators CP1, CP2. When the absolute value |Vb1−Vb2| is less than the symmetry threshold, the calculating module 21 determines that the lamp current I1a is in a symmetrical state and sets the output to the control circuit 3 (symmetry detecting output) Ve to the High level, and when the absolute value |Vb1−Vb2| is equal to or greater than the symmetry threshold, the calculating module 21 determines that the lamp current I1a is in the asymmetrical state and sets the symmetry detecting output Ve to the Low level.

Figure 13:
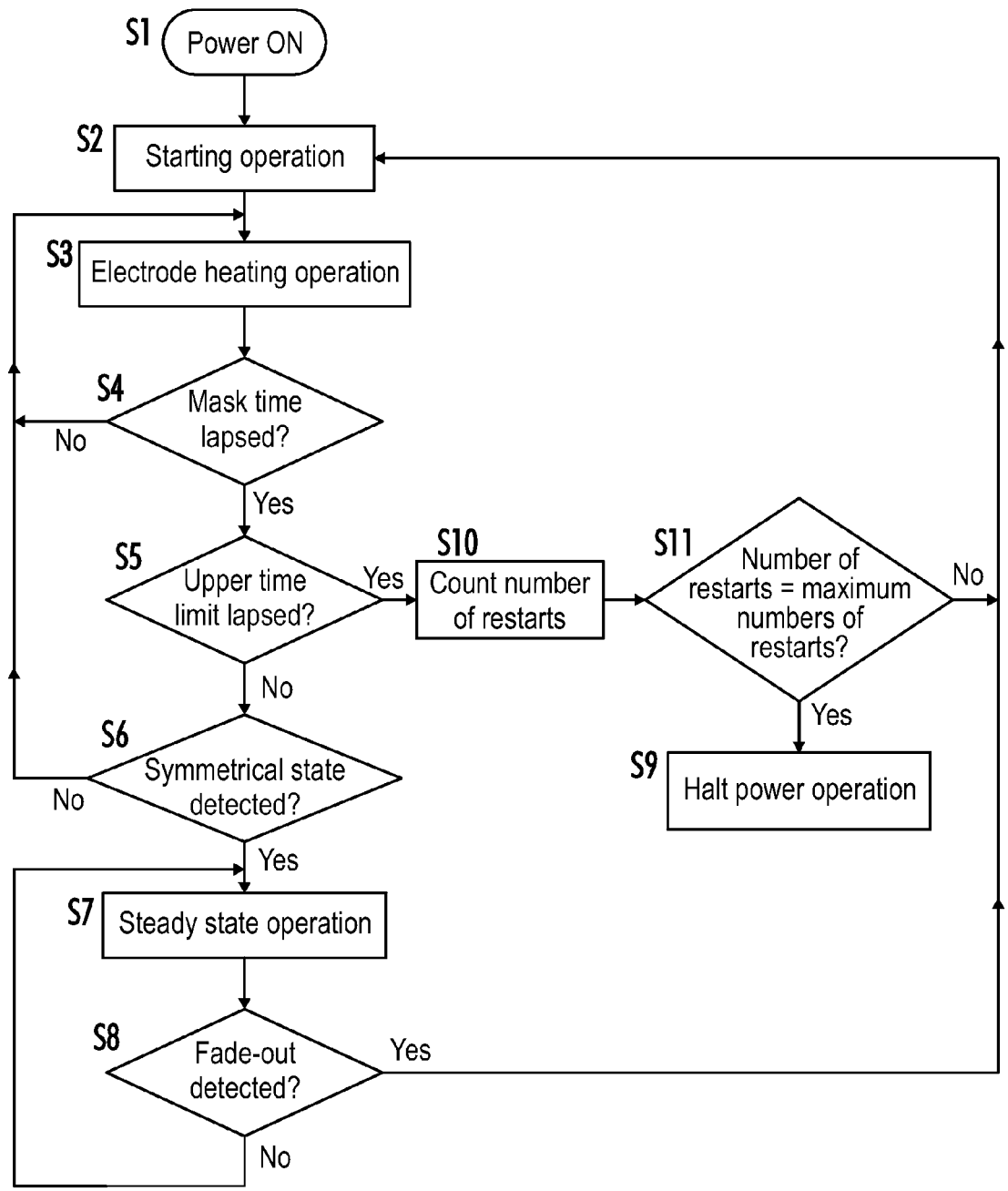
FIG. 13 is a flow chart showing a method of operation in the embodiment of FIG. 9.

When the duration of the electrode heating operation reaches the upper time limit (YES at Step S5), the electrode heating operation may be returned to the starting operation at Step S2 as shown in FIG. 13 in place of immediately terminating power supplied to the discharge lamp La as shown in FIG. 6. Adopting this configuration, starting ability can be improved as compared to the example shown in FIG. 6. Furthermore, in an example shown in FIG. 13, the number of repetitions from Step S5 to Step S2 (hereinafter referred to as "number of restarts") is counted at Step S10 and compared with a predetermined maximum number of repetitions at Step S11. When the number of restarts reaches the maximum number of repetitions, the procedure does not return to Step S2 and proceeds to Step S9 where feeding power to the discharge lamp La is stopped. In other words, the operation does not return to the starting operation over the maximum number of repetitions, thereby capable of preventing unlimited repetitions of the above-mentioned loop and unnecessary electrical stress being exerted on the circuit components.

Figure 14:
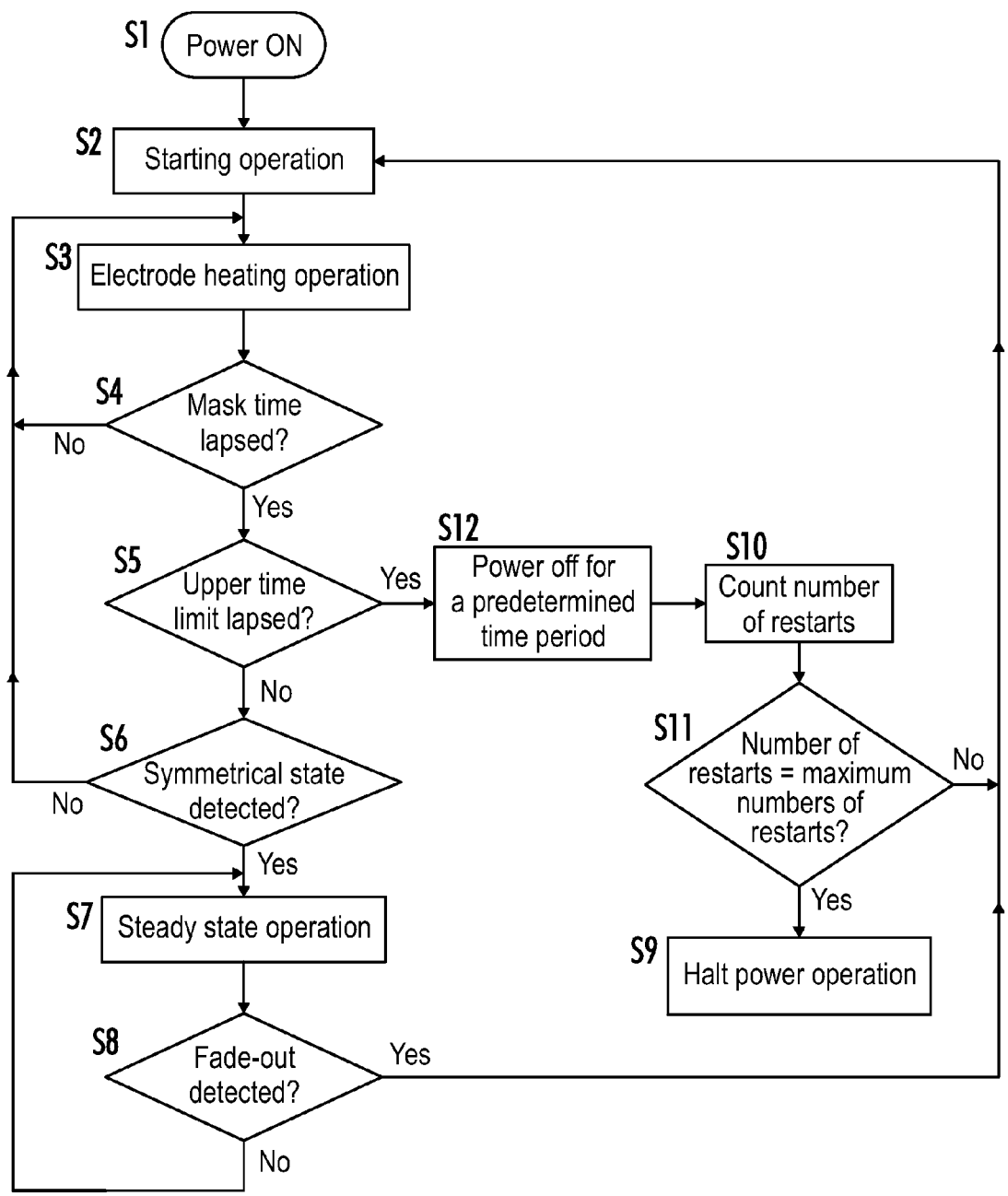
FIG. 14 is a flow chart showing an alternative method of operation in the embodiment of FIG. 9.

Furthermore, as shown in FIG. 14, before returning from Step S5 to Step S2, the control circuit 3 may stop feeding power to the discharge lamp La, for example, by turning off each of the switching elements Q1-Q4 for a predetermined time period (S12). By adopting this configuration, gas in the discharge lamp La becomes stabilized before the starting operation is restarted, and thus, in a next electrode heating operation, the lamp current I1a can be put into a symmetrical state within a relatively short time and the electrode heating operation can shift to the steady-state operation.

Figure 15:
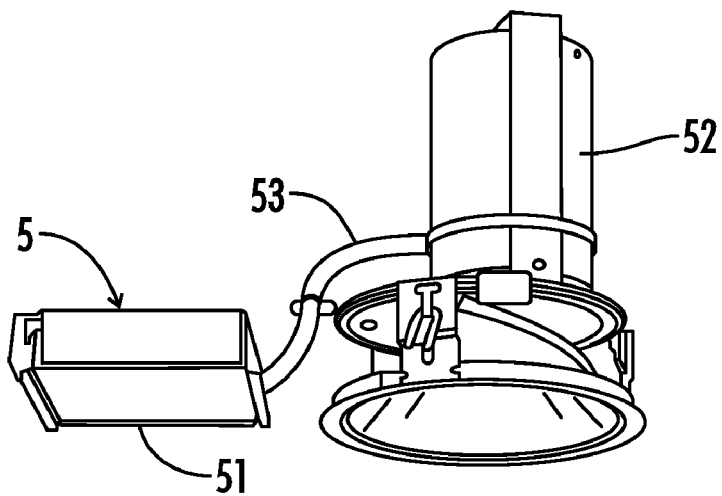
FIG. 15 is a perspective view showing an example of a lighting fixture using various embodiments of the ballast of the present invention.
Figure 16:
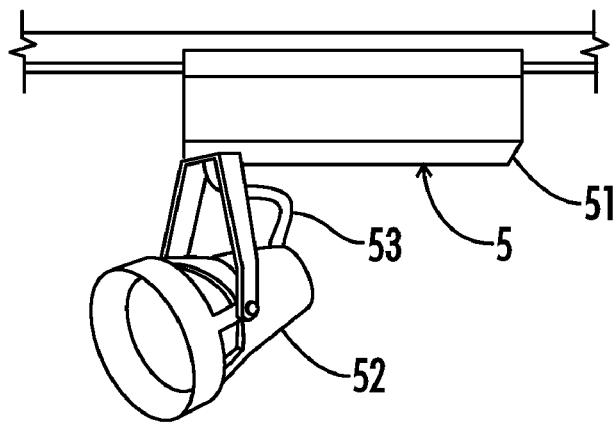
FIG. 16 is a perspective view showing another example of a lighting fixture using various embodiments of the present invention.
Figure 17:
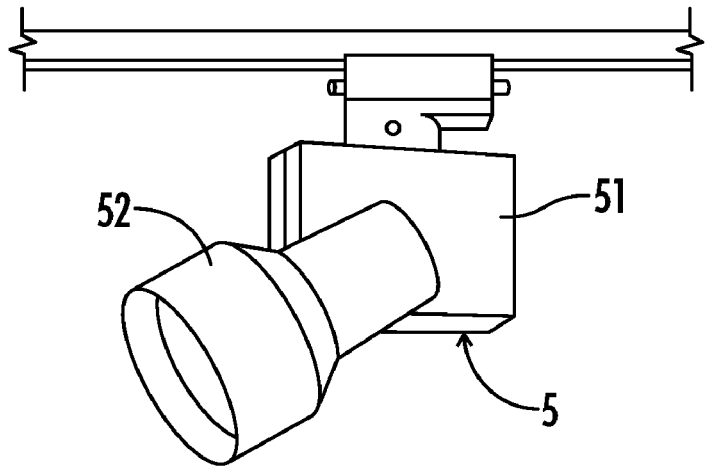
FIG. 17 is a perspective view showing still another example of a lighting fixture using various embodiments of the present invention.
Figure 18A:
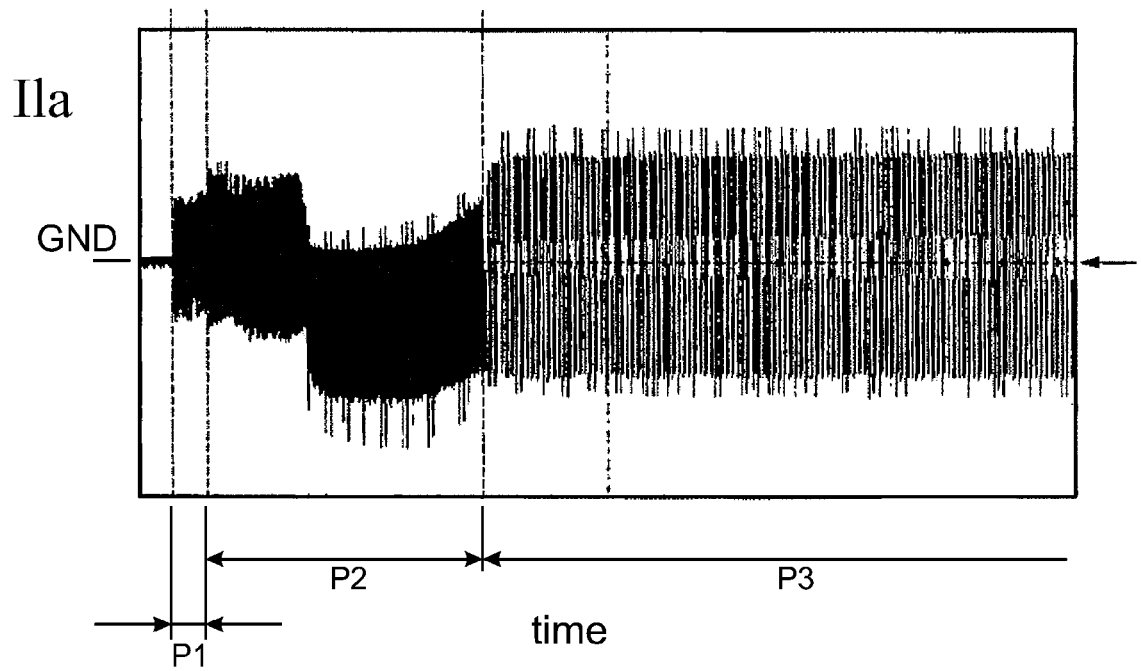
FIG. 18(a) is an illustrative diagram showing a waveform of the lamp current in the case where the duration of electrode heating operation is insufficient.
Figure 18B:
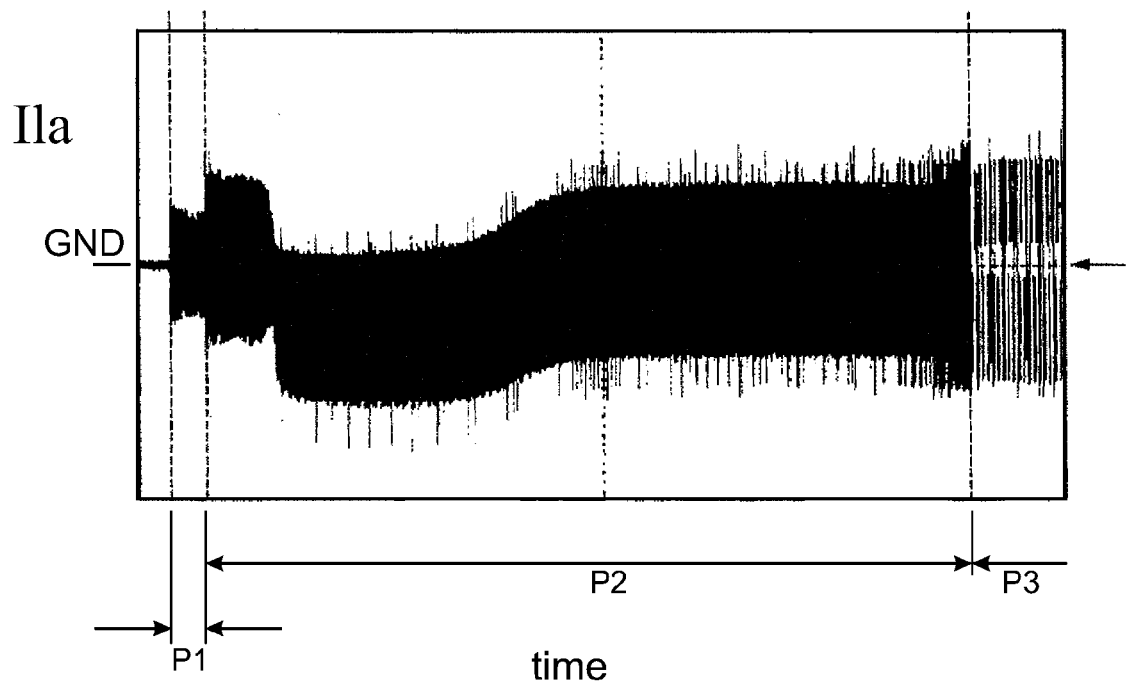
FIG. 18(b) is an illustrative diagram showing a waveform of the lamp current in the case where the duration of the electrode heating operation is sufficiently long.

The above-mentioned various electronic ballasts can be used in, for example, lighting fixtures 5 as shown in FIGS. 15 to 17. The lighting fixtures 5 in FIGS. 15 to 17 each include a fixture main body 51 for accommodating the electronic ballast 1 therein and a lamp body 52 for holding the discharge lamp La. The lighting fixture 5 in FIG. 15 and the lighting fixture 5 in FIG. 16 each have a power feeding line 53 for electrically connecting the electronic ballast 1 to the discharge lamp La. Since the above-mentioned various lighting fixtures 5 can be realized according to the known technique, detailed description thereof is omitted.

Thus, although there have been described particular embodiments of the present invention of a new and useful Electronic Ballast with Controlled Lamp Preheating, it is not intended that such references be construed as limitations upon the scope of this invention except as set forth in the following claims.

What is claimed is:

1. An electronic ballast comprising:
    a power converting circuit for receiving a DC power input and converting the DC power input into an AC power output;
    a starting circuit coupled between output terminals of the power converting circuit, and configured to generate a high voltage for starting a discharge lamp;
    a control circuit configured for controlling the power converting circuit to generate AC power output to the lamp dependent on a mode of operation; and
    a symmetry detecting circuit configured to determine a positive-negative symmetrical state of the output power provided to the discharge lamp with respect to ground, said symmetry detecting circuit comprising:
        a current transformer having a primary winding operable to connect in series with the lamp and a secondary winding with a center tap coupled to ground;
        a first capacitor coupled to a first end of a secondary winding of the current transformer,
        a second capacitor coupled to a second end of the secondary winding, and
        the symmetry detecting circuit configured to compare voltages across the capacitors with a predetermined threshold value to determine the positive-negative symmetrical state of the output power provided to the discharge lamp,
    wherein the control circuit further comprises
        a starting mode wherein the discharge lamp is triggered to start with a high voltage generated by the starting circuit,
        an electrode heating mode wherein the AC power output of the power converting circuit is controlled to a first frequency for heating each lamp electrode, and
        a steady-state mode wherein the AC power output of the power converting circuit is controlled to a second frequency for maintaining lighting of the discharge lamp,
    wherein the control circuit shifts from the electrode heating mode to the steady-state mode when the symmetry detecting circuit determines that the AC power output is in a positive-negative symmetrical state in the electrode heating operation.

2. The electronic ballast of claim 1, wherein the power converting circuit includes a step-down chopper circuit for lowering input DC power and a full bridge circuit for alternating the DC power output from the step-down chopper circuit.

3. The electronic ballast of claim 2, the step-down chopper circuit further comprising a switching element coupled on a first end to a positive terminal of the DC power input,
    wherein the control circuit controls the output power of the power converting circuit in steady state mode by controlling a duty ratio of the switching element in the step-down chopper circuit.

4. The electronic ballast of claim 1, wherein the power converting circuit includes a first pair of switching elements arranged in a half bridge circuit and
    the control circuit controls the output power of the power converting circuit by controlling a duty ratio of at least one switching element in the half bridge circuit.

5. The electronic ballast of claim 4, wherein the power converting circuit further includes a second pair of switching elements, the first and second pairs of switching elements arranged in a full bridge circuit, and
    the control circuit controls the output power of the power converting circuit by controlling the duty ratios of at least one switching element in each of the first and second pairs of switching elements in the full bridge circuit.

6. The electronic ballast of claim 1, wherein the symmetry detecting circuit determines whether or not the output power is in a positive-negative symmetrical state in the electrode heating mode.

7. The electronic ballast of claim 6, wherein the symmetry detecting circuit suspends determining whether or not the output power is in a positive-negative symmetrical state until a predetermined mask time has passed since start of the electrode heating mode, and
    the symmetry detecting circuit further determines whether or not the output power is in the positive-negative symmetrical state, said determination made continuously from a lapse of the mask time until the electrode heating mode is finished.

8. The electronic ballast of claim 6, wherein the symmetry detecting circuit suspends determining whether or not the output power is in a positive-negative symmetrical state until a predetermined mask time has passed since start of the electrode heating mode, and
    the symmetry detecting circuit further determines whether or not the output power is in the positive-negative symmetrical state, said determination made intermittently from a lapse of the mask time until the electrode heating mode is finished.

9. The electronic ballast of claim 1, wherein a predetermined upper time limit is established for the duration of the electrode heating mode.

10. The electronic ballast of claim 9, wherein when the duration of the electrode heating mode reaches the upper time limit without the symmetry detecting circuit determining that the output power is in a positive-negative symmetrical state, the control circuit stops outputting AC power from the power converting circuit.

11. The electronic ballast of claim 9, wherein when the duration of the electrode heating mode reaches the upper time limit without the symmetry detecting circuit determining that the output power is in a positive-negative symmetrical state, the control circuit returns from the electrode heating mode to the starting mode.

12. The electronic ballast of claim 11, wherein the control circuit stops outputting of AC power from the power converting circuit for a predetermined stop time, prior to returning from the electrode heating mode to the starting mode.

13. The electronic ballast according to claim 11, wherein the control circuit counts a number of times of returning from the electrode heating operation to the starting operation, and stops outputting of AC power from the power converting circuit upon the number of times reaching a predetermined upper limit number of times.

14. An electronic ballast comprising:
    a power converting circuit coupled to receive an input voltage, the power converting circuit further comprising a plurality of switching elements for converting the input voltage to an output voltage for powering a discharge lamp;

a current transformer having a primary winding coupled in series with the lamp and a secondary winding with a center tap coupled to ground;

a symmetry detecting circuit having
- a first capacitor coupled to a first end of a secondary winding of the current transformer,
- a second capacitor coupled to a second end of the secondary winding, and
- the symmetry detecting circuit configured to compare voltages across the capacitors with a predetermined threshold value and provide a symmetry detecting output dependent on the comparison; and a control circuit coupled to the plurality of switching elements and configured to control the output voltage of the power converting circuit, the control circuit further configured to control the switching elements at a first frequency to heat an electrode of the lamp after startup of the lamp and to shift control of the switching elements to a second lower frequency based at least in part on the symmetry detecting output.

15. The ballast of claim 14, the symmetry detecting circuit further configured to provide a first symmetry detecting output where the voltages across the first and second capacitors are greater than the threshold or a second symmetry detecting output where a voltage across either the first or second capacitor is less than the threshold.

16. The ballast of claim 15, the control circuit configured to shift from the first frequency for heating the electrodes to the second lower frequency upon receiving a first symmetry detecting output from the symmetry detecting circuit.

17. The ballast of claim 16, the control circuit configured to suppress the shift from the first frequency to the second frequency until a predetermined mask time lapses from the start of operation of the first frequency.

18. A method of operating an electronic ballast to power a discharge lamp, the electronic ballast comprising a power converting circuit having a plurality of switching elements, a starting circuit effective to provide a high voltage sufficient to start the discharge lamp, and a control circuit effective to control operation of the switching elements, the method comprising:

(a) receiving a DC power input at the power converting circuit and converting the DC power input to an AC power output;

(b) controlling the AC power output from the power converting circuit to the starting circuit to a level wherein the high voltage from the starting circuit sufficient to start the lamp is generated by the starting circuit;

(c) after lamp startup, controlling the AC power output from the power converting circuit to provide a high frequency voltage to the lamp for heating each electrode of the discharge lamp;

(d) detecting a positive-negative symmetrical state of the AC power output with respect to ground, said detecting comprising comparing a voltage of a first capacitor and a voltage of a second capacitor to a predetermined threshold value, wherein:
- the first capacitor is coupled to a first end of a secondary winding of a current transformer,
- the second capacitor is coupled to a second end of the secondary winding of the current transformer,
- the secondary winding of the current transformer has a center tap coupled to ground; and
- the current transformer has a primary winding coupled in series with the discharge lamp; and (e) upon detecting said symmetrical state, controlling the AC power output of the power converting circuit to reduce the frequency of the high frequency voltage to a level for maintaining steady state operation of the lamp.

19. The method of claim 18, step (d) further comprising:

(d) detecting a positive-negative symmetrical state of the AC power output with respect to ground, after lapse of a predetermined mask time from lamp startup.

20. The method of claim 19, further comprising the step of:

(f) upon failing to detect said symmetrical state prior to lapse of a predetermined upper time limit from lamp startup, terminating AC power output from the power converting circuit.

21. The method of claim 19, further comprising the step of:

(f) upon failing to detect said symmetrical state prior to lapse of a predetermined upper time limit from lamp startup, returning to step (b) and repeating the method from step (b) forward.

22. The method of claim 19, further comprising the step of:

(f) upon failing to detect said symmetrical state prior to lapse of a predetermined upper time limit from lamp startup, terminating AC power output from the power converting circuit for a predetermined stop time and subsequently returning to step (b) and repeating the method from step (b) forward.

23. The method of claim 22, further comprising the step of:

(g) counting within the control circuit the number of repetitions of step (f) and terminating AC power output from the power converting circuit without returning the method to step (b) upon reaching a predetermined upper limit of repetitions.

24. The method of claim 19, further comprising the steps of (h) after reaching steady-state operation of the lamp, monitoring the lamp to detect a fade-out condition; and (i) upon detecting the fade-out condition, controlling the AC power output of the power converting circuit to terminate steady-state operation, and subsequently returning to step (b).

* * * * *